United States Patent [19]

Brady et al.

[11] Patent Number: 5,303,207
[45] Date of Patent: Apr. 12, 1994

[54] ACOUSTIC LOCAL AREA NETWORKS

[75] Inventors: David P. Brady, Newton; Josko A. Catipovic, Woods Hole, both of Mass.

[73] Assignee: Northeastern University, Boston, Mass.

[21] Appl. No.: 967,346

[22] Filed: Oct. 27, 1992

[51] Int. Cl.$^5$ .......................................... H04B 11/00
[52] U.S. Cl. .................................................. 367/134
[58] Field of Search ................... 367/131, 134; 375/6; 455/40; 370/91, 94.1

[56] References Cited

PUBLICATIONS

Catipovic, J. et al., *An Acoustic Telemetry System For Deep Ocean Mooring Data Acquisition and Control*, Woods Hole Oceanographic Institution, Woods hole, Mass. 0254.
Catipovic, J. A. et al., *IEEE Journal of Oceanic Engineering*, vol. 16, No. 1, Jan. 1991.
Catipovic, J. A. et al., *IEEE Journal Of Oceanic Engineering*, vol. 15, No. 1, Jan. 1990.
Catipovic, J. et al., *Underwater Acoustic Local Area Network for ROV and Instrument Communications*, Woods Hole Oceanographic Institution.
Freitag, L. E. et al., *A Long-Term Deep-Water Acoustic Telemetry Experiment*, Woods Hole Oceanographic Institution, Woods Hole, Mass. 02543.
Chase, D., *IEEE Transactions On Communications*, vol. Com-33, No. 5, May 1985.
Segal, M. et al., *Optimal Source Localization and Tracking Using Arrays with Uncertainties in Sensor Locations* (Aug. 1989) Woods Hole Oceanographic Institution.
Stojanovic, M. et al., *Coherent Communications Over Long Range Underwater Acoustic Telemetry Channels*.
Duda, T. F., *IEEE Journal of Oceanic Engineering*, vol. 16, No. 1, Jan. 1991.
Brady, David et al., *Robust Multiuser Communications for Underwater Acoustic Channels*, May 1, 1992.

*Primary Examiner*—Daniel T. Pihulic
*Attorney, Agent, or Firm*—Weingarten, Schurgin, Gagnebin & Hayes

[57] ABSTRACT

An underwater local area network for oceanographic observation and data acquisition includes a network node for telemetering data to a final destination and a plurality of sensors each of the sensors having an acoustic modem to transmit information to the network node.

17 Claims, 9 Drawing Sheets

ACOUSTIC LOCAL AREA NETWORKS

FIELD OF THE INVENTION

This invention relates generally to communication networks and more particularly to local area networks

BACKGROUND OF THE INVENTION

As is known in the art a local area network is a communications network that interconnects of a variety of data communicating devices generally within a physically limited area. Points in a network where communication service is provided, used or where communication channels are interconnected are generally referred to as network nodes or simply nodes. Connected to each of the nodes are devices, generally referred to as stations, which wish to receive and transmit data. The network nodes may be connected using so-called internodal links. Thus, the stations may receive and transmit data via the network nodes and internodal links.

The internodal links between such nodes may be provided as so called point-to-point, multi-point or store-and-forward links. A point-to-point link is a transmission facility that connects only two nodes. A point-to-point transmission facility allows many nodes to communicate with a common node through non-interfering channels. One problem in some point-to-point systems however is that such systems have an internodal acoustic telemetry channel which is a broadcast channel to which all stations coupled to the network have access. This requires a careful orchestration of data packet transmission activity to minimize interference between two packet streams routed through common nodes. Thus, interference from non-neighboring nodes may result.

The so-called multi-point or multi-drop facilities provides service to many nodes that share access to the same transmission facility.

In so called store-and-forward systems, a message from one station is received at a computer acting as a switch and is stored there. After the computer has determined a destination address and an available communication circuit, the message is forwarded to the destination. This method may also be referred to as message switching. In some applications the length of the transmissions handled is limited by breaking up long messages into packets and thus is generally referred to as packet switching.

As is also known, local area networks generally have a set of rules for communicating between nodes generally referred to as a network protocol. In formulating the protocols, the network nodes are generally assumed to have an infinite energy supply and the protocols fail to minimize the number of retransmissions which occur in the network. Furthermore, the round trip propagation time between nodes is generally not a concern in such local area networks. Thus, network protocols are generally formulated to maximize network throughput and minimize expected delay.

In some applications however it may be desirable to have packet transmissions which are power efficient and which minimize the number of retransmissions in a network. This is particularly true in those applications where the network nodes may be provided having non-replaceable non-rechargeable power supplies.

SUMMARY OF THE INVENTION

In accordance with the present invention, an underwater local area network for oceanographic observation and data acquisition includes a plurality of sensors each of the sensors having an acoustic modem and a receiver, a common receiver in communication with each of a plurality of sensors, a mooring and a mooring network controller disposed in the mooring. With this particular arrangement a distributed underwater local area network which can forward a particular telemetry packet through several network nodes before finally reaching a destination is provided. The network nodes establish virtual circuits by defining node sequences used to root a particular packet. The virtual circuits may be adaptively defined depending on current node configuration, environmental considerations, and other network traffic. The protocol for the underwater local area network establishes a two-way virtual circuit from each modem wishing to communicate to a destination. The network protocol adaptively establishes, maintains and terminates virtual circuits. Each of the virtual circuits includes a set of ordered store-and-forward nodes from the source to the destination. The virtual circuits are initiated and terminated by the source and are maintained until the source disconnects or data throughput decreases past that threshold which indicates overload on some part of the virtual circuit. When throughput decreases the virtual circuit is shut down and a new routing list may be established.

In accordance with a further aspect of the present invention an underwater local area network includes a central node coupled to a surface buoy. The central node includes an area telemetry link, an acoustic modem and a network controller. A plurality of sensor stations, each having an acoustic modem, transmit and receive signals to and from the central node. With this particular arrangement, an underwater local area network which uses a so-called single hop protocol is provided. In the single hop protocol, each of the sensor stations asynchronously transmit signals directly to the controller node. The controller node receiver may be provided having a joint channel/data estimator capable of estimating and tracking required channel parameters. This is particularly important in underwater acoustic local area networks where asynchronous subsurface transmitters may need to telemeter data ashore via the central acoustic node. The protocol is based on resolving contending asynchronous channel access requests from the subsurface sensor stations in the central node. Each of the modems disposed in the sensor stations may operate in a standby or idle mode until the station initiates a transmission process by transmitting a reservation request to the central node through a common request channel. To access the central node modem through the request channel, the station modems asynchronously transmit a signal corresponding to a reservation request signal. The reservation request signal requests the central node to provide a reservation time during which the sensor station may transmit a predetermined number of data packets of a predetermined length to the central node. Since channel sensing is not employed by the sensor station modems, there is a possibility that request packets may collide on the request channel. Thus, a request channel receiver provides the underwater acoustic local area network having a collision resolving capability. Each sensor station modem monitors a downlink frequency on which a signal corresponding to an acknowledgement packet signal provides the modem identification code in the appropriate data channel. After receipt of the acknowledgement signal, the sensor modem immediately transmits a data packet on the assigned data channel. A network scheduler identifies an available slot for the requested data packet transmission based on network transmission characteristics including but not limited to the round trip propagation time between the particular sensor station requesting access and the central node, the current transmission schedule and the like. The network scheduler expects to receive the data packets following a duration of time equal to the computed propagation delay added to a fixed processing time. Requests are scheduled sequentially and a data channel on which the data will be transmitted from the sensor modem to the central node is selected for each request based on factors including but not limited to the distance between the sensor modem and the central node, current channel delay estimates in order to minimize the packet delay and the like. Thus, upon receipt of the request data packets, the central node including the request channel receiver attempts to resolve request data packet collisions, schedules the data packet requests on one of the available data channels and notifies the sensor station modem corresponding to each particular data packet of its reservation one round trip propagation time before the expected data packet reception. If the sensor modem does not receive an acknowledgement packet within a first predetermined amount of time, then the sensor modem assumes a collision on the request channel has occurred, waits a second predetermined amount of time and repeats the request process. If the receiver in the central node does not receive data at the appropriate time, the central node reinitiates the scheduling and acknowledgement process for the particular modem whose data was not received.

BRIEF DESCRIPTION OF THE DRAWINGS

The foregoing features of this invention as well as the invention itself may be more fully understood from the following detailed description in which.

DESCRIPTION OF THE PREFERRED EMBODIMENTS

Figure 1:
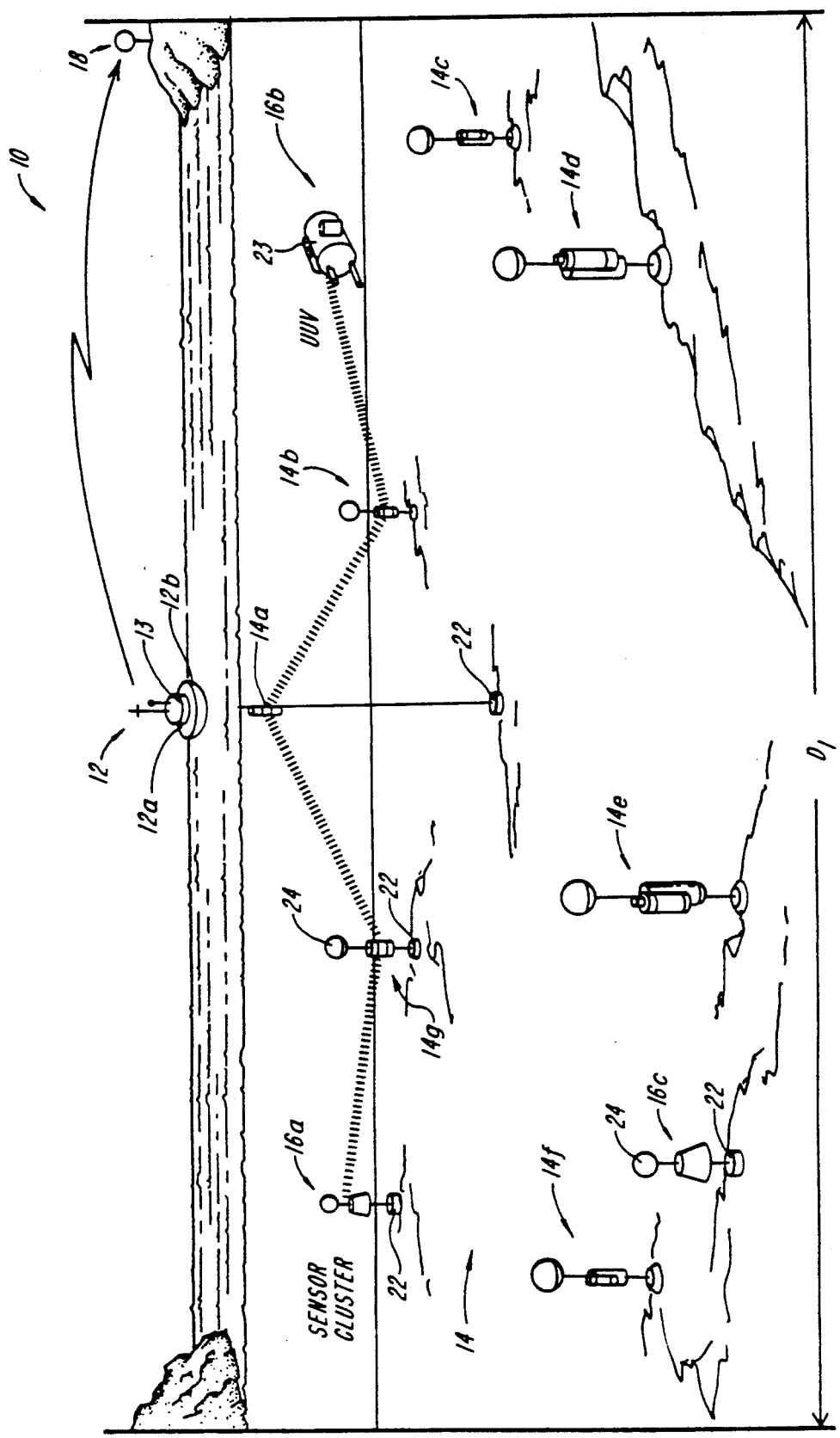
FIG. 1 is a diagrammatical representation of one embodiment of an underwater acoustic local area network.

Referring now to FIG. 1, an underwater acoustic local area network (ALAN) 10, here shown deployed in a shallow water environment, includes a plurality of network nodes 14a-14g generally denoted 14, each of the nodes adapted for transmitting and receiving acoustic signals. It should be noted that the so-called shallow water environment is here distinguished from a so-called deep water environment by the transmission characteristics of a communication channel in the water environment. Deep water is defined to be that depth of water in which the communication channel is provided having a substantially ideal impulse response (i.e. no rapid amplitude or phase variations with respect to time).

A home station 12 includes a surface buoy 13 having disposed therein an RF transmitter 12a and a home station modem 12b having a unique identification code. The RF transmitter 12a transmits data fed thereto from the home station modem 12b to a distant shore based user 18 for example. The home station 12 is coupled to the first end of a line 20 having a second end coupled to an anchor 22.

The network nodes 14 will be described further in conjunction with FIG. 2 below. Suffice it here to say that each network node 14 has a unique identification code which enables each of the nodes 14 to identify and communicate with each other. Each of the network nodes 14 are also adapted to maintain a real time measure of environmental conditions. Furthermore each of the nodes 14 are capable of adaptively routing messages between each of the several the several nodes 14 to the home station 12.

A plurality of sensor stations 16a-16c generally denoted 16, each provided having coupled thereto a sensor (not shown) and an acoustic modem (not shown) are disposed in a region about the ALAN system 10. Sensor stations 16a and 16c are tethered via a line 2 to an anchor 22 and thus held in a substantially fixed location. A flotation device 24 maintains the sensor stations 16a, 16c in a predetermined position. The sensor station 16b is here disposed on a so-called untethered underwater roving vehicle 23 (UUV) which may travel throughout the region in which the ALAN system 10 is disposed. Here, the vehicle 23 is unmanned, alternatively the vehicle may be a manned vehicle or may be a marine animal or inhabitant of the water environment in which the ALAn system is deployed.

As will be described further in conjunction with FIG. 4 below, when the underwater acoustic local area network 10 is disposed in a shallow water environment, the network may utilize a so-called multi-hop protocol in which signals may be transmitted from one of the plurality of sensor stations 16 to a first one of the plurality of network nodes 14 and subsequently to a destination such as the home station 12 for example.

In general overview, the underwater local area network 10 is provided having a communication protocol selected to support multiuser communication while minimizing the degradation of single user communication rate and throughput. Shallow water acoustic channels are generally prone to localized jamming, e.g., from passing traffic and spatially dependent ambient noise. Thus, the communication protocol of the ALAN system 10 is specifically to accommodate such characteristics.

Each of the network nodes 14 adaptively monitors the characteristics of each communication channel and maintains a real time measure of environmental conditions. Furthermore each of the network nodes 14 are capable of adaptively routing messages through a selected one of a plurality of communication paths. Such a selection may be made for example according to the transmission characteristics of the communication channels at a particular point in time.

For example, when a ship is transiting the area in which the ALAN system 10 operates causing a high noise region, network communications may automatically be routed to communication paths which avoid the high noise region near the vessel. Also if a particular one of the nodes 14a–14g fails, the adjacent or neighboring network nodes may determine the node failure and communication signals may be routed onto communication paths which avoid the failed node. Furthermore, the RF transmitter 12a disposed in the home station 12 may transmit a message to the shore based observer 18 who may thus be notified of a potential throughput bottleneck.

Moreover, the network nodes 14 may operate in both a stand by power conservation mode or a power up mode. In the stand by mode, the node 14 consumes a minimum amount of energy and operates primarily as a receiver. In the power up mode however, the node may transmit signals, receive signals and process signals. Thus, the amount of power consumed in each of the nodes 14 may be adaptively adjusted to optimize data throughput and minimize the amount of energy used in each of the nodes 14.

As will be described further below in conjunction with FIG. 4, the network nodes 14 may receive transmissions from the sensor stations 16, for example, and adaptively form a virtual circuit along which communication and data signals may be transmitted from a particular one of the sensor stations 16 to the home station 12. The signals may be transmitted from a particular one of the sensor stations 16 to the home station 12 on any one of a plurality of signal paths. A particular signal path may be selected based on a variety of factors including but not limited to the present characteristics of the communication channels.

Figure 2:
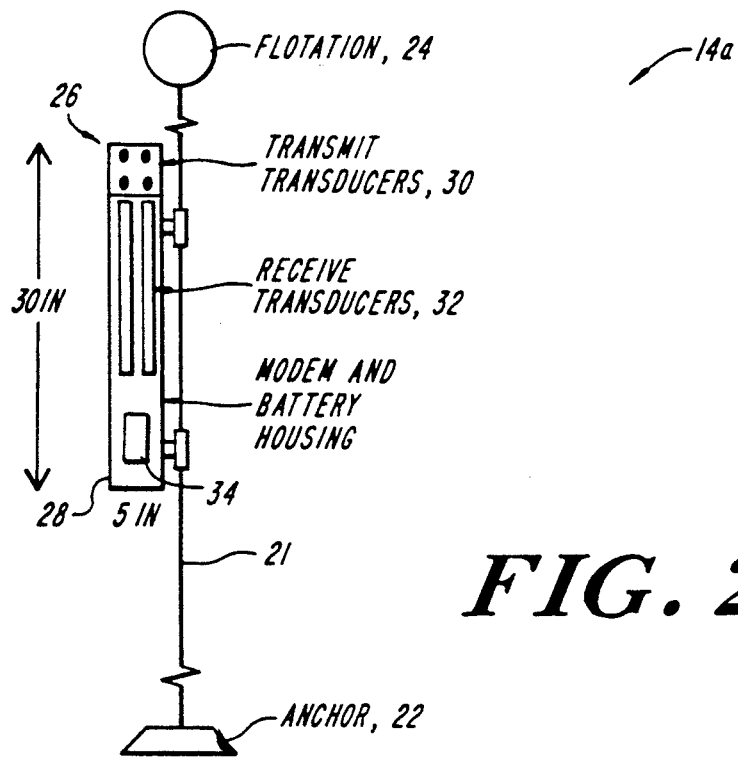
FIG. 2 is a diagrammatical representation of an acoustic network node.

Referring now to FIG. 2, taking the acoustic network node 14a as representative of the nodes 14b–14g, the node 14a includes a flotation device 24 coupled to the first end of the line 21. The second end of the line is coupled to the anchor 22. A modem 26 is disposed in a housing 28 which is coupled to the line 21. As will be described further in conjunction with FIG. 3 below, the modem 28 includes, inter alia, a transmit transducer 30, a receive transducer 32, and a power source 34 which may be provided as a battery for example. The transducers 30, 32 are each provided having transmit and receive acoustic patterns which are substantially omnidirectional.

Figure 3:
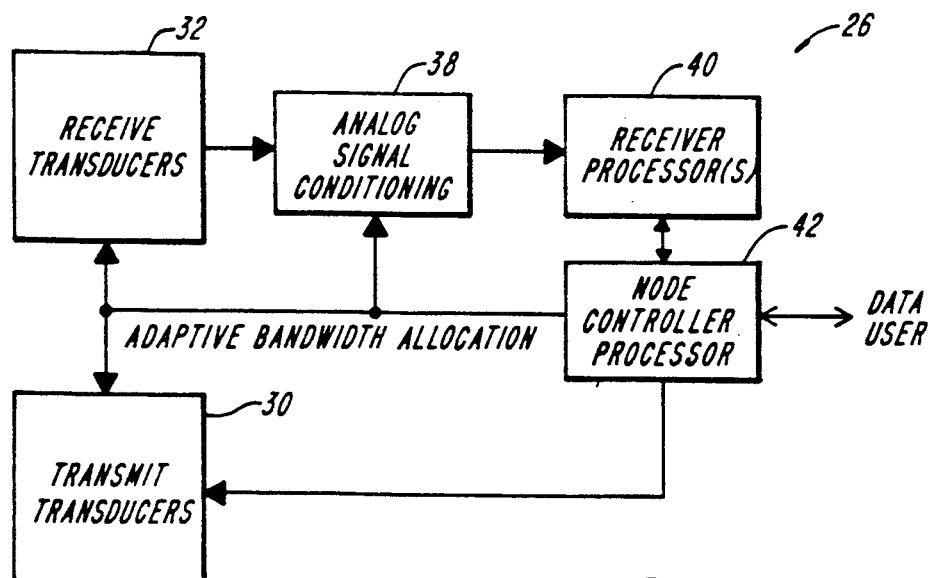
FIG. 3 is a block diagram of a modem architecture.

Referring now to FIG. 3, the receive transducer 32 of the modem 26 is coupled to an analog signal conditioning circuit 38 which feeds a signal to a receiver processor 40. The receiver processor includes, inter alia, a request channel receiver which will be described in conjunction with FIG. 4 below. The receiver processor 40 is coupled to a node controller processor 42 which is in turn coupled to transmit and receive transducers 30 and 3 respectively.

Figure 4:
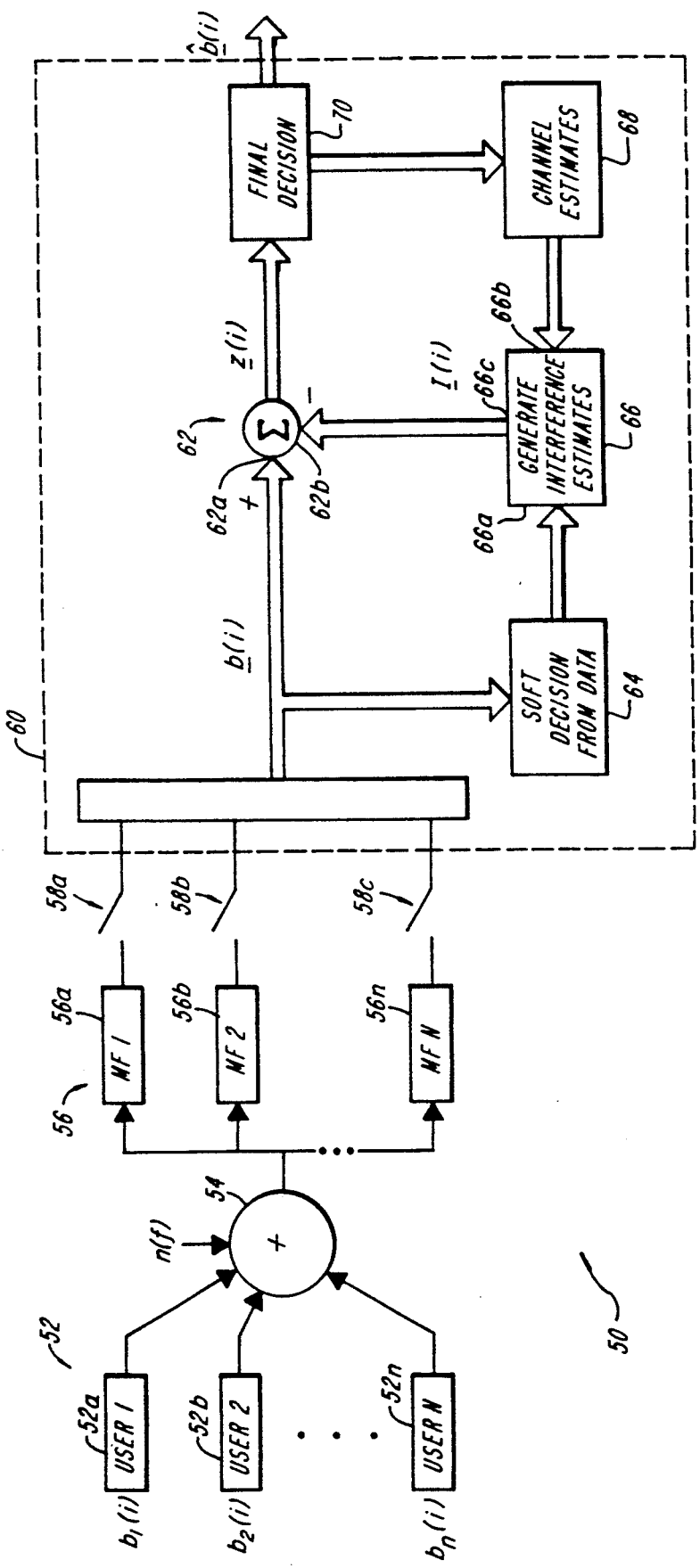
FIG. 4 is a block diagram of a request channel receiver.

Referring now to FIG. 4, a receiver 50 simultaneously receives, on the request channel, request data packets in the form of BPSK input signals from a plurality of users 52a–52N and noise signals n(f) through a front end receiver 54.

Figure 4A:
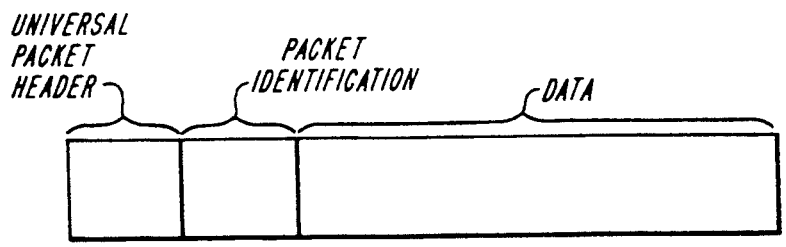
FIG. 4A is a request data packet.

Referring briefly to FIG. 4A, a request data packet at least includes a universal packet header portion, a packet identification number portion and a data portion. The universal packet header may be used to identify the presence of a packet within a plurality of collided packets and the packet identification portion may be provided as a tone sequence which may be used to identify the source of the request data packet.

Referring again to FIG. 4, the receiver output is fed to a plurality of matched filter circuits 56a–56N, generally denoted 56, as is generally known. The filtered signals are fed from each of the matched filters 56a–56N through a corresponding one of the detectors 58a–58N and are subsequently coupled to a request channel receiver 60. In the request channel receiver 60, the signals are coupled to a first input 62a of a summing circuit 62. The signals are also coupled to a soft decision circuit which makes so-called soft decisions according to the data fed thereto. An interference estimator 66 receives a first input signal from the soft decision circuit 64 and a second input signal from a channel estimator 68. The channel estimator 68 provides an estimate of the characteristics of each channel based on a variety of factors including but not limited the phase, doppler shift, amplitude and timing of signals received from each user. It should be noted that if there is significant channel distortion, the matched filter/symbol rate sampler may be replaced by a high rate sampler.

The interference estimator 66 combines the two input signals and provides a signal corresponding to an estimate of the interference on each of the communication channels utilized by the users 52. The interference estimator 66 feeds an estimate of the interference signal to an input port 62b of the summing circuit 62. The summing circuit 62 subtracts the interference estimate provided on the input port 62b from the signal provided on the input port 62a to thus provide an output signal Z(j). The summing circuit output signal Z(j) is fed to a final decision processor 70 which further processes the signals and feeds a final output signal b(j) to an output port of the receiver 50. The processor 70 also feeds the signal to the channel estimator 68 which may use such the signal to update the estimate of the characteristics of each channel. Thus, the request channel receiver 60 makes soft decisions and adaptively updates the data upon which both hard and soft decisions are made to resolve collisions between data packets and thus minimize the number of required retransmissions from each of the sensor stations 16.

Figure 5:
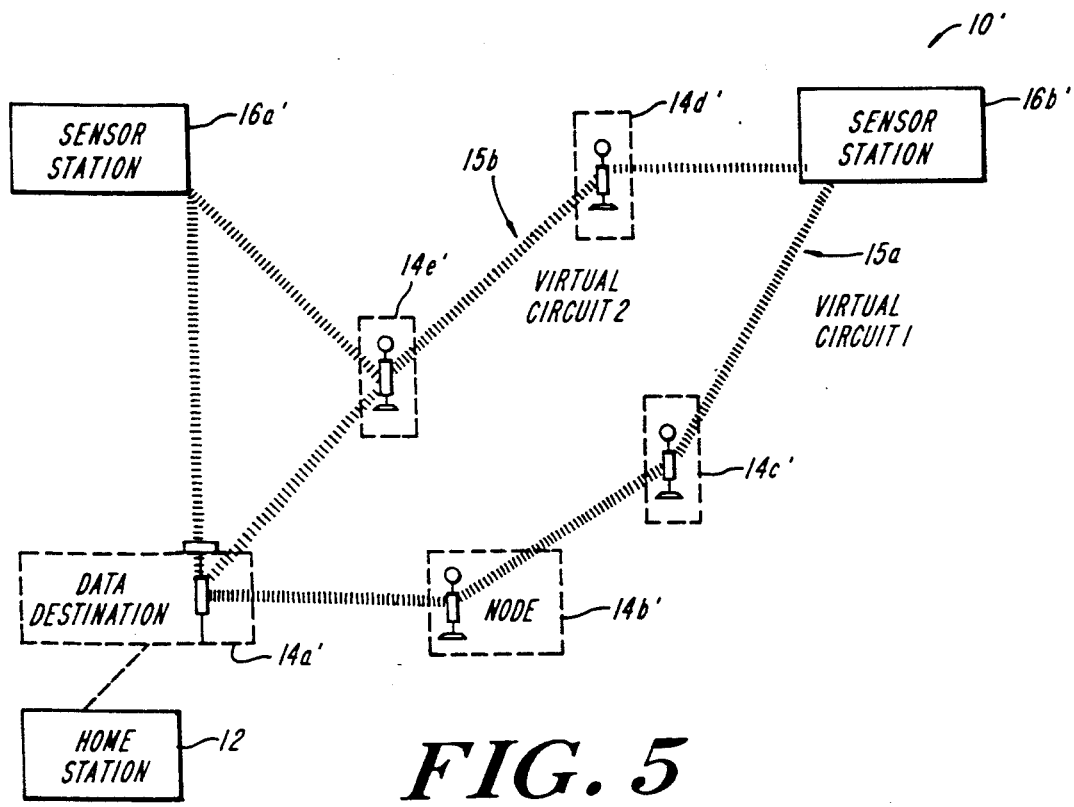
FIG. 5 is a diagrammatical circuit of a virtual circuit.

Referring now to FIG. 5, a network 10' is shown having a plurality of virtual circuits 15a, 15b established by the network nodes 14a'–14'e. The virtual circuits 15a, 15b are established by defining node sequences used to route a particular data packet from a source such as one of the sensor stations 16a', 16b' to a final destination such as the home station 12'. The virtual circuits 15a, 15b may be adaptively defined depending on network characteristics such as but not limited to a particular node configuration (i.e the physical location of each node 14') at a particular point in time, environmental conditions and the amount of information being transmitted in the network 10'.

Each of the virtual circuits 15a, 15b are comprised of a set of ordered store-and-forward nodes 14a'-14b' from a source, sensor station 16a' for example to a destination, home station 12 for example. As will be described further below, the virtual circuits 15a, 15b are initiated and terminated by the source and are maintained until the source disconnects or data throughput decreases past the threshold, which indicates overload on some part of the virtual circuit. When the throughput decreases, the virtual circuit is shut down and a new routing is established. Thus, the underwater acoustic local area network 10' adaptively provides virtual circuits to connect sources and destinations.

The protocol for telemetry establishes a two-way virtual from each one of the network nodes 14a'-14e' wishing to communicate to its destination. The network protocol centers around adaptively establishing, maintaining and terminating virtual circuits.

It should be noted that the network nodes 14' may be deployed to provide a random network topology. That is, when the network nodes 14' are first deployed they may be physically distributed in random locations throughout a predetermined region. Thus, each network node 14' must locate and identify any neighboring network nodes 14'.

To implement the protocol, the acoustic bandwidth of the underwater acoustic local area network 10', is divided into a single control channel and a plurality of data communication channels The control channel may be used to maintain the virtual circuit, while data packets are transmitted and received on the dedicated data channels. The data channels may occupy a frequency bandwidth typically of about 5-10 kilohertz while the control channels may occupy a frequency bandwidth typically of about one kilohertz.

In FIG. 5 for example, the pair of stations 16a', 16b' each wish to transmit data to the home station 12'. The first virtual circuit 15a formed by network nodes 14a', 14b' and 14c', would be selected for the station 16b' in order to avoid potential conflicts with the station 16a'. Station 16a' may make an adaptive decision on whether its data should be transmitted directly to the node 14a' or repeated by the intermediate node 14e'. The network 10' maximizes the number of simultaneous virtual circuits subject to current environmental conditions and network topography.

Figure 6:
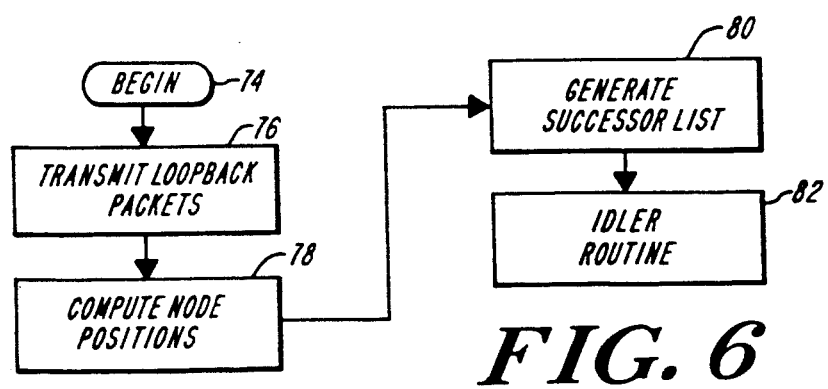
FIG. 6 is a flow diagram of the processing steps performed in a network node.

FIG. 6 shows a flow diagram of the processing performed in the processors of the modems upon deployment of the ALAN system 10. In the flow diagram, the rectangular shaped elements (typified by element 76) herein denoted "processing blocks" represent processor instructions or groups of instructions. The diamond shaped elements (typified by element 86—FIG. 7) herein denoted "decision blocks" represent processor instructions or groups of instructions which affect the execution of the computer software instructions represented by the processing blocks. The flow diagram does not depict syntax or any particular processor programming language Rather, the flow diagram illustrates the functional information one skilled in the art requires to generate processor instructions to perform the processing required of the modems. It should be noted that many routine program elements such as initialization of loops and variables and the use of temporary variables are not shown.

Each of the nodes 14 of the ALAN system 10 are deployed and are programmed to perform a calibration-/initialization procedure in a predetermined sequence. Thus, as shown in processing block 76 a first one of the plurality of network nodes, node 14a for example, transmits a loopback data packet to particular, predetermined node, node 14b for example. The node 14a then receives a signal back from node 14b and computes the distance, signal propagation time, etc... to the node 14b. The node 14 a repeats this process with each node 14 in the network 10. The node 14a also may transmit a signal to node 14b with instructions for the node 14b to forward the signal to node 14c. Node 14c then sends the signals back to node 14a. Thus, as shown in processing block 78 the node 14a may compute the distances between other nodes and perform a triangulation computation to determine node positions relative to the homes station 12. After node 14a completes this process, the node 14a generates a successor list table and stores the table in a modem memory as shown in processing block 80. The successor list is a list of proximal nodes which may serve as successors to that particular node.

In processor block 82, the node 14 then operates in a standby or idle mode. Each node in the network 10 performs these process steps to generate a corresponding successor list. The idler routine maintains predetermined power levels in the modem and periodically causes the modem to update its successor list. The successor list table is preferably adaptively updated to account for changing environmental conditions and to incorporate changes in network node topology. The order of each entry in the successor list table is selected according to but not limited to factors such as internode delay time, direction, transmission loss, channel stability and other environmental information.

It is critical for rapid establishment of virtual circuits that the current status of each successor be known at a given node at a predetermined point in time. Each of the nodes 14 may obtain this information by monitoring signal transmissions on the control channel. However, it may sometimes be necessary for a node to explicitly interrogate a particular successor node if the node has received no recent transmissions. This is particularly true if the successor node has failed or if there fails to be an acoustic channel between two nodes.

Each node in the virtual circuit may monitor the performance of the link to its successor and terminate the link should the performance deteriorate below a predetermined level. Thus the node processors may compute performance based on factors including but not limited to data throughput, required power, and/or the volume of transmissions on a predetermined channel.

Figure 7:
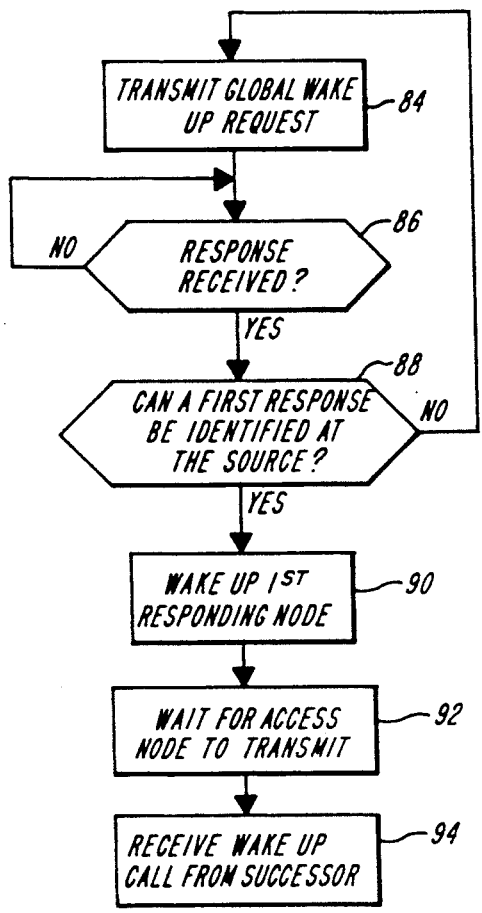
FIG. 7 is a flow diagram of the processing steps performed in a network node.

Turning now to FIG. 7 the processing steps performed in the node processors to establish a virtual circuit are shown. As shown in processing block 84, a source such as one of the sensor stations 16 initiates the virtual circuit by transmitting a global wake up request through the control channel and all nodes within range may respond to the global wake up request. Each of the nodes responds on the particular data channel specified by the source. Only those nodes which are available and which have available successors respond to this request and power down immediately thereafter.

The source receives response signals from each node which responds to the global wake up request signal. As shown in decision block 88, if the source is unable to identify the first responding node from a plurality of responding nodes 14 the source again transmits a global wake up request signal.

In processing block 90, if the source identifies the first responding node the source wakes up the first responding node on the control channel by transmitting to that particular node a data packet containing the virtual circuit identification code, the source identification code, the node identification code and the received frequency band.

As shown in processing block 92, the source station or node which transmitted the global wake up request then waits for the access node to transmit a signal. If the source receives a signals form the access node then the link between the two nodes is established.

Figure 8:
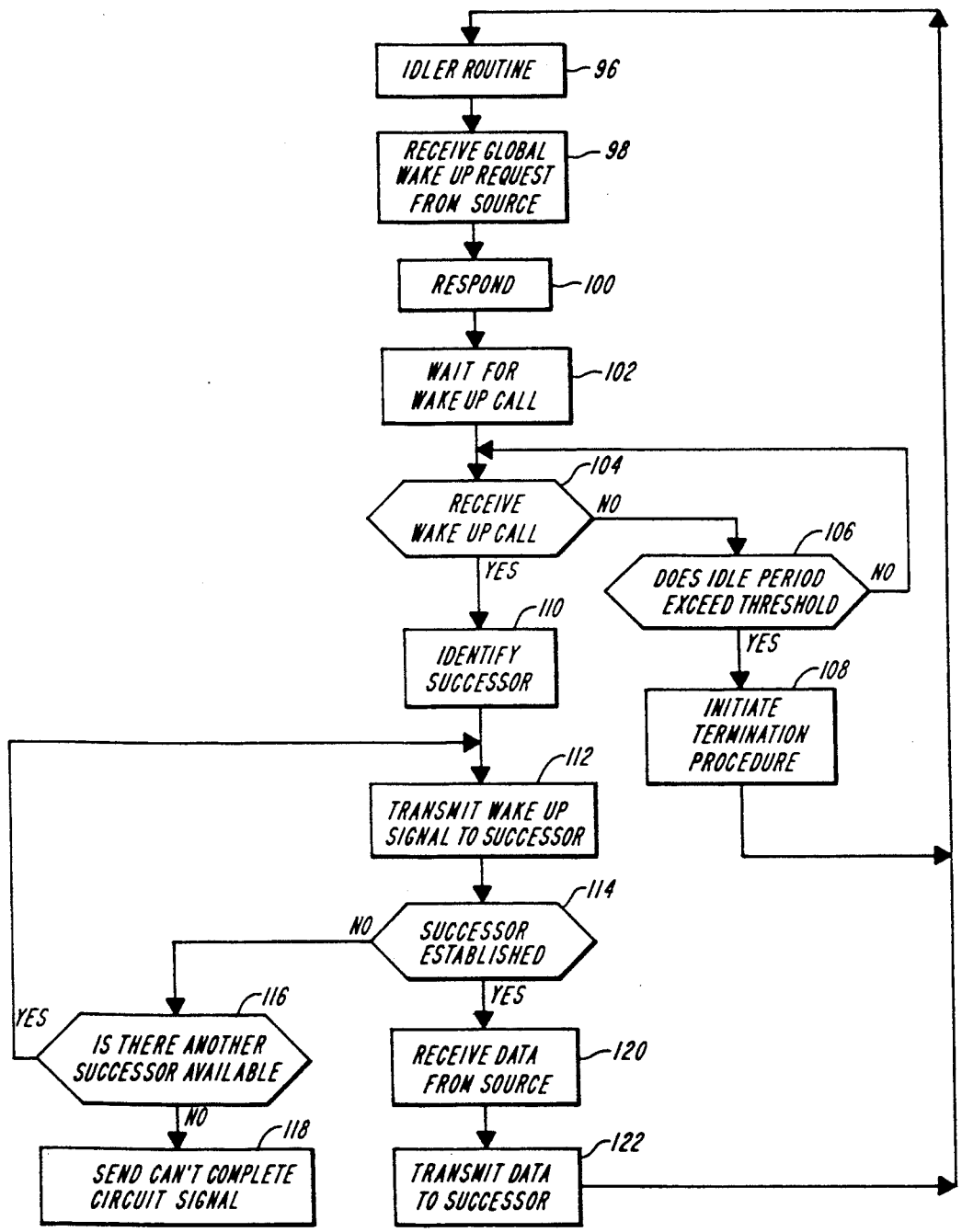
FIG. 8 is a flow diagram of the processing steps performed in a network node.

Referring now to FIG. 8 a set of processing steps in response to the processing steps performed in FIG. 7 are performed by those nodes which did not transmit the global wake up request. Thus as shown in processing blocks 98 and 100 the node receives and responds to a global wake up request. In processing block 102 the node waits for a wake up call.

Decision block 106 implements a loop in which if the node fails to receive a wake up call in a predetermined amount of time then as shown in processing block 108 the node initiates a termination procedure.

If the node receives a wake up call, then this node recognizes from the source identification code that it is the first or access node for that particular virtual circuit. In processing block 110, the node identifies its successor node by referring to its successor node list and sends a wake-up signal to the successor node. The node thus serves as both an access node and a source node. That is, the node is an access node to the source and the node is also a source to another access node.

In processing block 112 the node transmits, on a control channel, a wake-up signal corresponding to a control channel data packet similar in structure to the wake-up signal mentioned above to its successor node on. The source which initiated the virtual circuit also receives this data packet since the control channel is monitored by every network node and station. Thus each node in the virtual circuit may confirm that an access node has been established.

The access node then scans its node activity list and wakes up its successor node in a similar fashion. Each successor wake-up data packet provides information to the nodes predecessor and successor, the former knowing that the intended node is connected to the virtual circuit. At the end of this procedure, each node is ready to forward the subsequent data packets.

Each virtual circuit has for each data symbol a unique signature sequence as well as a unique pattern of data channel frequencies. Thus, if a node is requested to become a part of a virtual circuit, a virtual circuit identification code and a particular receive channel is provided to the node. The node may therefore determine the transmit frequency and the transit frequency of the downstream node.

The source selects the initial data channel and the access node uses this in the virtual circuit identifier to determine the channel to its successor node. Each successor node receives the virtual circuit identifier as well as the current data channel and determines the next frequency link. Successor transmissions serve as acknowledgement signals and identify that portion of the previous data packet which was not understood.

It should be noted that this knowledge is acquired without interrupting the flow of information from the source to the destination since the packet structure allows for a transmission of erasures in a compact fashion. Each virtual circuit is assigned a unique frequency sequence in order to minimize the effect of co-channel collisions on proximal portions of two virtual circuits.

Based on the measured throughput of the first link, a source may determine whether to continue transmission on a current virtual circuit or to terminate transmission. A virtual circuit is terminated by the source by ceasing transmission on the current link frequency. At this time the source may initiate contention for a new virtual circuit or may leave the network altogether. All further responsibility for terminating the virtual circuit is assumed by the access node, which begins the termination process when an idle period exceeds a predetermined threshold.

The access node may then transmit a special termination packet to its successor node, notify the other nodes that it is available through the control channel and then power down. Each successor node then repeats the process. The destination eventually receives the termination packet and realizes that the source has terminated the current virtual circuit. Thus the virtual circuit is terminated.

Figure 9:
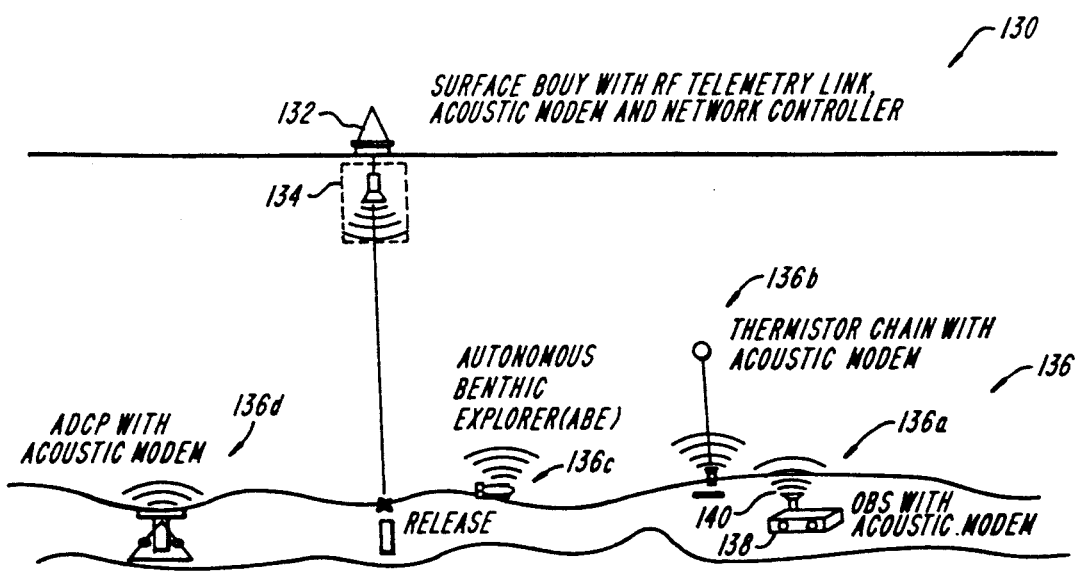
FIG. 9 is a diagrammatical representation of an underwater local area network deployed in deep water.

Referring now to FIG. 9, an underwater acoustic local area network 130, here shown disposed in a deep water environment, includes a surface buoy 132 disposed on a surface of the water environment and a collision resolving central node 134. The surface buoy has disposed therein an RF telemetry link to communicate with a land based user for example. The central node 132 includes an acoustic modem, a network controller and an acoustic hydrophone.

The system 130 further includes a plurality of sensor stations 136a–136e, generally denoted 136. Each of the sensor stations is disposed below a surface of the water and have disposed therein a sensor 138, an acoustic modem 140 and a recorder 141. The sensors 138 may be provided as an ocean bottom seismometer, a thermistor chain, a current meter array, an acoustic doppler current profiler, an imaging system or the like. Here each of the sensors 138 are provided as fixed near bottom sensors. It should be noted however that the sensors and modems may also be disposed on a UUV as described herein above in conjunction with FIG. 1.

Each of the sensor stations 136 also includes an asynchronous transmitter. In the system 10, a single hop protocol allows efficient communication between each of the near bottom sensor stations 136 and the central node 132. The protocol also minimizes idle time due to propagation delays and provides high energy efficiency at the sensor stations. The protocol is based on asynchronous channel access requests from the subsurface sensors 136 and the collision resolving central node 132.

Figure 10:
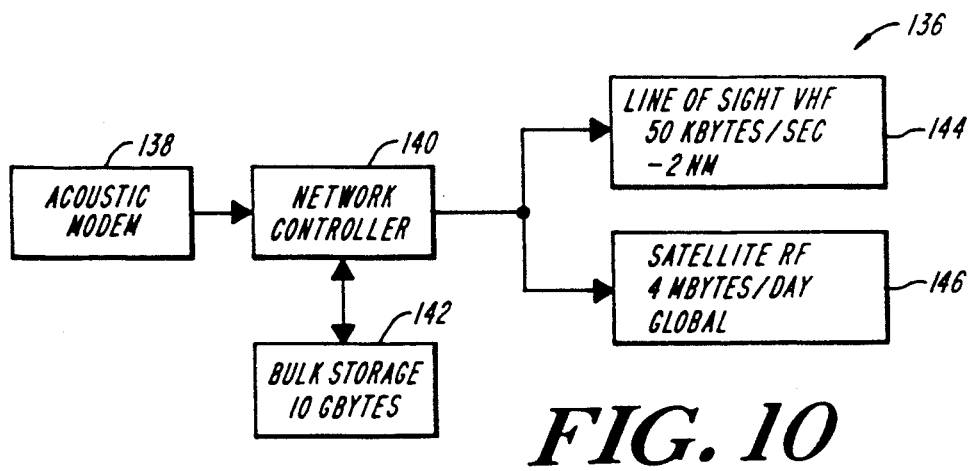
FIG. 10 is a block diagram of the central node electronics.

Referring now to FIG. 10, the collision resolving central node includes an acoustic modem 138 coupled to a network controller 140. The acoustic modem includes a request a channel receiver which may be similar to the request channel receiver 60 described above in conjunction with FIG. 4. The network controller 140 is also coupled to a mass storage device 142. The network controller 140 may feed data to a VHF line of sight telemetry circuit 144 and a satellite RF telemetry circuit 146 for transmission to a shore based user for example as is generally known.

Figure 11:
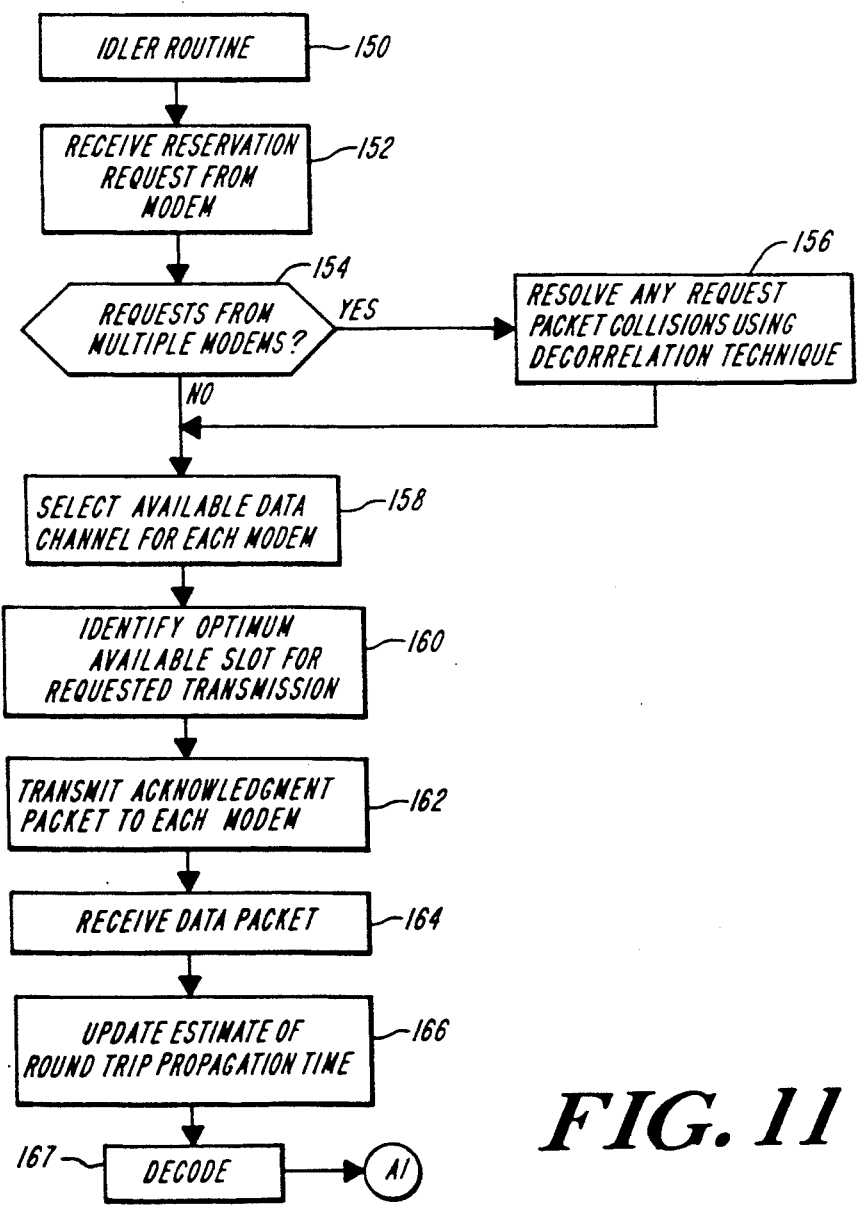
FIGS. 11 and 11A are a series of flow diagrams of the processing steps performed in a network node.
Figure 11A:
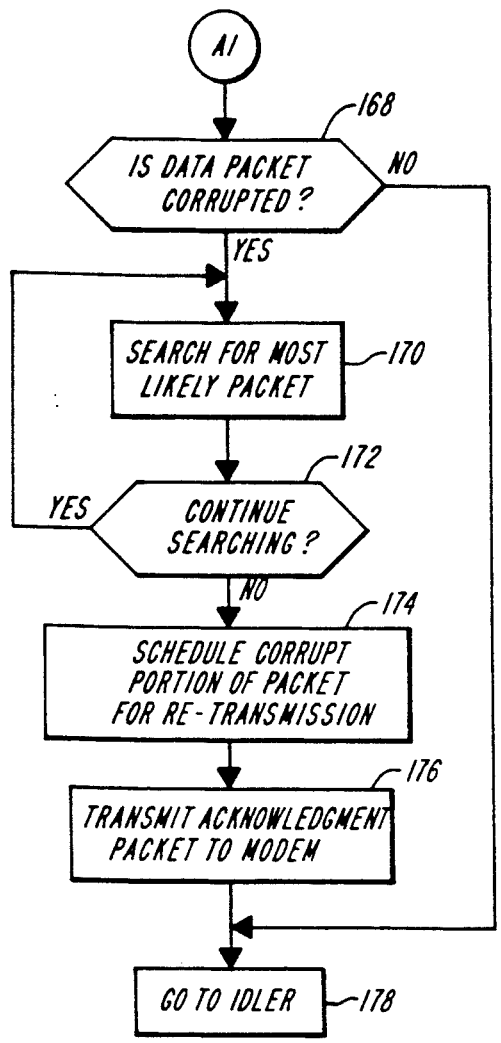
Figure 12:
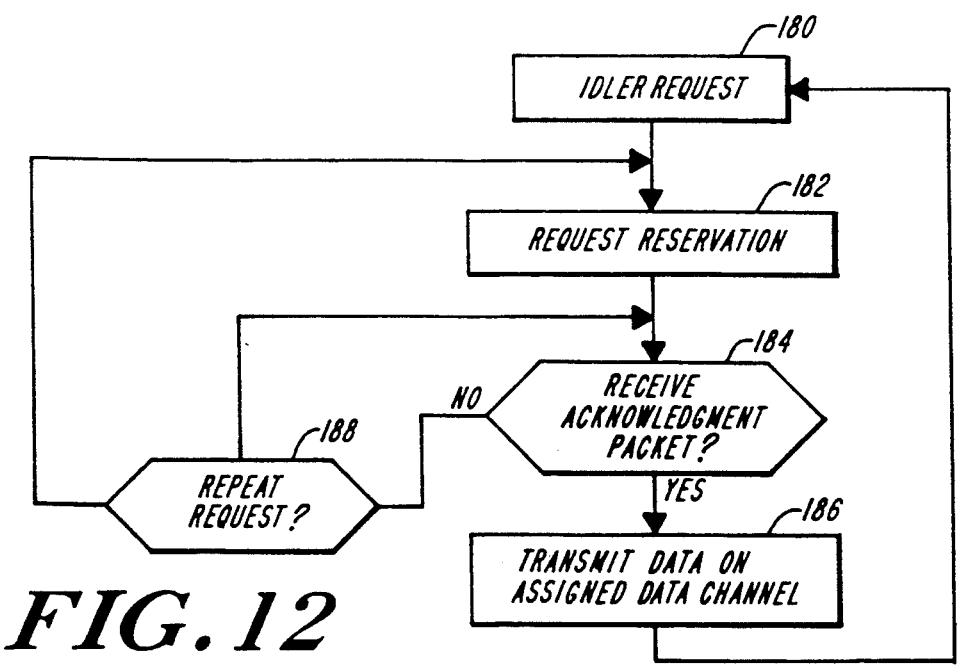
FIG. 12 is a flow diagram of the processing steps performed in a network node.

Referring now to FIGS. 11–12 a pair of flow diagrams showing the processing steps to communicate between the central node 123 and the stations 136 are shown.

As shown in processing block 180 (FIG. 12), the stations 136 operate in a standby mode until, as shown in processing block 182, one of the stations 136 initiates the transmission process by asking for a reservation through the common request channel.

Figure 13:
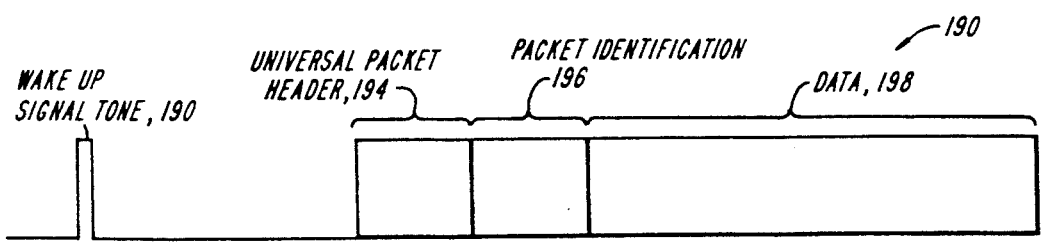
FIG. 13 is a diagrammatical representation of a request data packet.

Referring briefly to FIG. 13, a reservation request packet is shown to be preceded by a wake up signal tone 192 which alerts the central node 134 that a signal from one of the stations will shortly be received. Thus, the central node may switch from its standby mode to a power up mode. The wake up signal tone is followed by a data packet similar to the data packet described below in conjunction with FIG. 4A.

Referring again to FIGS. 11-12 each of the modems access the request channel asynchronously, simply asking for a reservation to transmit a certain number of data packets. Since channel sensing is not employed by the sensors, the possibility of packet collisions exists on this request channel.

Referring now to FIG 11, in processing step 152, the central node receives the reservation request from the sensor station modem. In decision block 154 the central processors determine if requests form multiple sensor station modems have been received. If multiple requests have been received, then as shown in processing block 156 any request packet collisions are resolved using a decorrelation technique similar to the technique described below in conjunction with FIG. 4 below.

In processing block 158, the central node processor identifies available data channels and in processing block 160 the central node processor identifies an optimum available slot for transmission on a particular data channel. As shown in processing block 162 the central node 134 then transmits an acknowledgement packet to each modem. In response to receiving this acknowledgment 10 packet the sensor station 136 immediately transmits its data packet to the control node 134.

In processing blocks 166, 167 the central node processor updates its estimation of round trip propagation time and decodes the received data packet.

In decision block 168 a decision is made as to whether the data packet is corrupt. If the data packet is not corrupt, the central node returns to the standby node as shown in processing block 178.

If the data is corrupt, processing block 170 and decision block 172 implement a loop in which a search for the most likely packet is implemented. Then as shown in processing block 174 the central node transmits an acknowledgment packet to the modem form which the corrupt data packet was received.

Figure 14:
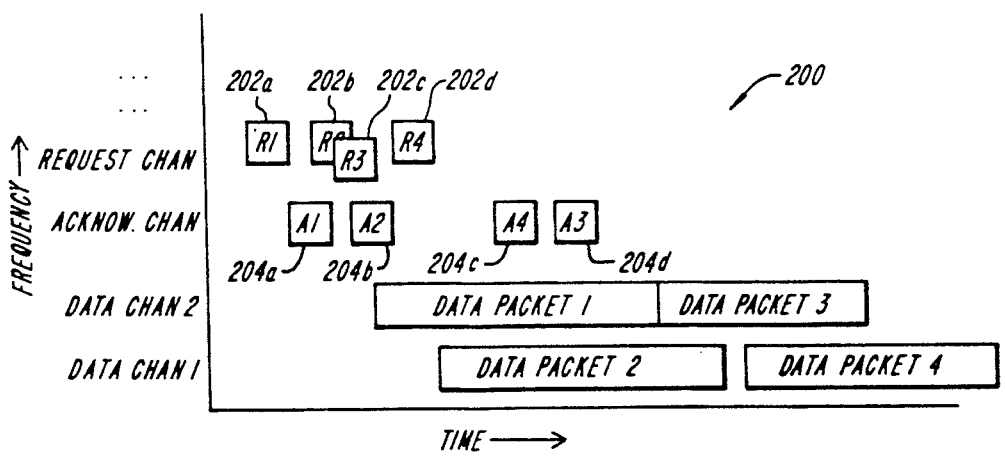
FIG. 14 is a plot of frequency versus tie showing data transmission in the system of FIG. 9.

Referring now to FIG. 14, a plurality of requests 202a-202d have been made sequentially by four different sensor station modems (not shown) 1-4. Here, a collision of request packets 202b, 202c has occurred. Each modem monitors a separate, common downlink for an acknowledgment packet, which provides the modem identifier and the appropriate data channel. After receipt of the acknowledgment 204a-204d the modem transmits immediately on the assigned data channel. In FIG. 13 the acknowledgment packets 202a-204d are transmitted sequentially to modems 1, 2, 4 and 3 (not shown). Timing is important in this portion of the process, since the network scheduler has used the round-trip propagation time and the current transmission schedule to find an available slot for the requested transmission, and is expecting the data packets following a duration equal to his propagation delay (plus some fixed processing time). In this particular example, the order of the acknowledgment packets 204a-204d for modems 3 and 4 is reversed from the order of the request packets 202a-202d since modem 4 is more distant than modem 3. Requests are scheduled sequentially, and a data channel is selected based on modem range and present characteristics of the channel estimates in order to minimize the packet delay. If the modem does not receive an acknowledgment packet within a fixed amount of time, then it assumes a collision on the request channel, waits random amount of time, and repeats the request process. If the surface receiver does not receive data at the appropriate time, it reinitiates the scheduling and acknowledgment processes for modem.

Upon reception of the request packets, the surface receiver attempts to resolve request packet collisions, schedules the requests on one of the available data channels, and notifies each packet of their reservation one round-trip propagation time before the expected data packet reception. Request packets are very short (typically of about 100 bits) and will be transmitted once per transmit session, not for each data packet. Therefore the probability of request packet overlap will be small, and the additional processing burden can be met with modest processing hardware, using the presented algorithm.

Having described preferred embodiments of the invention it will now become apparent to one of skill in the art that other embodiments incorporating their concepts may be used.

For example, the acoustic recorders disposed in the ALAN modems may be provided as high quality acoustic recorders and may be useful to record ambient noises and events. Thus the ALAN system may be used as a wide-aperture acoustic array for beamforming and source localization.

This wide aperture acoustic array feature may be particularly useful for example to monitor and track acoustic events, including but not limited to, seismic disturbances and marine mammal vocalizations. Each of the modems in the ALAN system may be programmed by the network controller to record ambient acoustic noise. The location of each modem/recorder is known apriori, as it is computed during the network initialization procedure. However, recorders record data asynchronously and thus must be synchronized prior to beamforming and source localization.

This may be accomplished, for example, by transmitting reference waveforms from known locations during the recording interval. The locations of the reference transmitters and the modems are known. The resultant delay distributions between the known transmit locations and the known sensor positions may be compared and thus the acoustic recordings may be resynchronized.

It is believed therefore, that these embodiments should not be limited to disclosed embodiments but rather should be limited only by the spirit and scope of the appended claims.

I claim:

1. A network node receiver for simultaneously receiving signals from a plurality of stations coupled to a local area network and for resolving collisions between the received signals, said network node receiver having an input port and an output port and comprising:

a soft decision processor, having an input port coupled to the input port of the network node receiver, for making an initial interpretation of the characteristics of data fed thereto;

a channel estimator for providing a signal corresponding to the characteristics of a communication channel;

an interference estimator coupled to said soft decision processor and said channel estimator, wherein said interference estimator receives a first signal from said soft decision processor and a second signal from said channel estimator and provides an interference signal at an output port;

a summing circuit having a first input port coupled to the input port of the network node receiver, a second input port coupled to the output port of said interference estimator and an output port coupled to an output port of the network node receiver, wherein said summing circuit combines the signals fed thereto at the first and second input ports and provides an output signal to the output port of said network node receiver.

2. The network node receiver of claim 1 further comprising:

a final decision processor, coupled between the output port of said summing circuit and the output port of the network node receiver, said final decision processor for providing signals to said channel estimate wherein the signals describe channel characteristics; and wherein said channel estimator uses the signals fed thereto from said final decision processor to update the estimates of the channel characteristics provided to said interference estimator.

3. An underwater local area network for oceanographic observation and data acquisition comprising:

a plurality of network nodes, each of said network nodes capable of transmitting and receiving signals on a request channel and each of said nodes comprising a request channel receiver adapted for receiving request signals transmitted on said request channel and capable of resolving collisions between a plurality of simultaneously received request signals wherein at least two of said plurality of simultaneously received request signals arrive at said receiver asynchronously and are provided having substantially the same carrier frequency.

4. The underwater local area network of claim 3 wherein said network node receiver comprises:

a soft decision processor, having an input port coupled to the network node receiver, for making an initial interpretation of the characteristics of data fed thereto;

a channel estimator for providing a signal corresponding to the characteristics of a communication channel;

an interference estimator coupled to said soft decision processor and said channel estimator, wherein said interference estimator receives a first signal from said soft decision processor and a second signal from said channel estimator and provides an interference signal at an output port;

a summing circuit having a first input port coupled to the network node receiver, a second input port coupled to the output port of said interference estimator and an output port coupled to an output port of the network node receiver, wherein said summing circuit combines the signals fed thereto at the first and second input ports and provides an output signal to the output port of said network node receiver;

a final decision processor, coupled between the output port of said summing circuit and the output port of the network node receiver, said final decision processor for providing signals to said channel estimator, wherein the signals describe channel characteristics; and wherein said channel estimator uses the signals fed thereto from said final decision processor to update the estimates of the channel characteristics provided to said interference estimator.

5. The underwater local area network of claim 3 wherein each of said network nodes comprises:

a modem for transmitting signals to and receiving signals form each of said plurality of network nodes;

a flotation device; and an anchor wherein said modem is coupled between said modem is coupled between said flotation device and said anchor.

6. The underwater local area network of claim 5 further comprising:

a plurality of stations, each of said stations capable of transmitting signals to and receiving signals from each of said network nodes and wherein a first one of said stations corresponds to a home station and at least one of said plurality of stations comprises:

a sensor; and an acoustic modem, coupled to said sensor, for monitoring oceanographic phenomena and transmitting acoustic signals to at least one of said plurality of network nodes.

7. The underwater local area network of claim 6 wherein said home station comprises:

a network controller processor;

a modem, coupled to said network controller processor, for transmitting and receiving signals to and from each of said plurality of network nodes;

a storage medium coupled to said network controller processor; and a radio frequency modem, coupled to said network controller processor and said modem, for transmitting signals to a shore based user.

8. The underwater local area network of claim 6 wherein:

at least one of said plurality of sensors corresponds to a first one of:

an ocean bottom seismometer;

a thermistor chain;

a current meter array;

an acoustic doppler current profiler; and an imaging system; and the at least one of said plurality of stations further comprises:

a flotation device; and an anchor wherein said modem is coupled between said modem is coupled between said flotation device and said anchor.

9. The underwater local area network of claim 6 wherein:

at least one of said plurality of sensors corresponds to a first one of:

an ocean bottom seismometer;

a thermistor chain;

a current meter array;

an acoustic doppler current profiler; and an imaging system; and at least one of said plurality of stations is disposed on an untethered underwater platform.

10. The underwater local area network of claim 6 wherein said acoustic modem comprises:
- a node controller processor;
- a receiver processor coupled to said node controller processor;
- a receive transducer;
- an analog signal conditioning circuit coupled between said receive transducer and said receiver processor and coupled to said node controller processor;
- a transmit transducer coupled to said node controller processor; and
- a power source, for providing power to said acoustic modem.

11. A local area network for acquiring oceanographic data comprising:
- a network node comprising a network node receiver; and
- a plurality of stations each of said stations comprising:
  - a sensor; and
  - an acoustic modem adapted for transmitting signals to and receiving signals from said network node, wherein said network node receiver resolves collisions between a plurality of simultaneously received signals transmitted by said acoustic modem and wherein at least two of said signals arrive at said receiver asynchronously and are provided having substantially the same carrier frequency.

12. The underwater local area network of claim 11 wherein said network node receiver comprises:
- a soft decision processor, having an input port coupled to the network node receiver, for making an initial interpretation of the characteristics of data fed thereto;
- a channel estimator for providing a signal corresponding to the characteristics of a communication channel;
- an interference estimator coupled to said soft decision processor and said channel estimator, wherein said interference estimator receives a first signal from said soft decision processor and a second signal from said channel estimator and provides an interference signal at an output port;
- a summing circuit having a first input port coupled to the network node receiver, a second input port coupled to the output port of said interference estimator and an output port coupled to an output port of the network node receiver, wherein said summing circuit combines the signals fed thereto at the first and second input ports and provides an output signal to the output port of said network node receiver;
- a final decision processor, coupled between the output port of said summing circuit and the output port of the network node receiver, said final decision processor for providing signals to said channel estimator, wherein the signals describe channel characteristics; and
- wherein said channel estimator uses the signals fed thereto from said final decision processor to update the estimates of the channel characteristics provided to said interference estimator.

13. The underwater local area network of claim 12 wherein said acoustic modem comprises:
- a node controller processor;
- a receiver processor coupled to said node controller processor;
- a receive transducer;
- an analog signal conditioning circuit coupled between said receive transducer and said receiver processor and coupled to said node controller processor;
- a transmit transducer coupled to said node controller processor; and
- a power source.

14. The underwater local area network of claim 13 further comprising a home station wherein said home station comprises:
- a network controller processor;
- a modem, coupled to said network controller processor, for transmitting and receiving signals to and from said network node;
- a storage medium coupled to said network controller processor; and
- a radio frequency modem, coupled to said network controller processor and said modem, for transmitting signals to a shore based user.

15. A method for resolving collisions between reservation request packets in a communication channel comprising the steps of:
(a) simultaneously receiving a plurality of filtered request signals in a request channel receiver wherein each of said request signals are received from different communication channels;
(b) reading a universal packet header in each of the request signals to determine the number of filtered request signals received in said receiving step;
(c) estimating the data contained in each of the received request signals;
(d) generating, for each communication channel, an interference signal having characteristics corresponding to the interference characteristics of a corresponding one of the communication channels on which a request signal was received in said receiving step;
(e) compensating each of said received request signals by an amount corresponding to the interference signal generated for the corresponding communication channel in said generating step; and
(f) providing a compensated signal to an output port of the request channel receiver.

16. The method of claim 15 wherein said generating step comprises the step of updating the interference estimate of each communication channel based on the compensated signal.

17. A method of transmitting and receiving signals between a plurality of modems and a central node on a common request channel, said method comprising the steps of:
(a) asynchronously accessing a common request channel via a first one of the plurality of modems;
(b) transmitting, via the first modem, a request signal for a reservation to transmit a predetermined number of data packets from said first modem through the common request channel to the central node;
(c) transmitting an acknowledgment packet from the central node, wherein said acknowledgment packet includes a modem identification code and a data channel identification code;
(c) receiving, in the first modem, the acknowledgment packet transmitted from the central node; and
(d) transmitting data on a data channel corresponding to the data channel identified by the data channel identifier assigned in said transmitting step (c).

* * * * *

UNITED STATES PATENT AND TRADEMARK OFFICE
CERTIFICATE OF CORRECTION

PATENT NO. : 5,303,207
DATED : April 12, 1994
INVENTOR(S) : David P. Brady, et al It is certified that error appears in the above-indentified patent and that said Letters Patent is hereby corrected as shown below:

Sheet 5 of 9, on Fig. 9, on the reference labeled 130, "BOUY" should read --BUOY--.

Column 1, line 6, "networks" should read --networks.--.

Column 4, line 1, "tie" should read --time--.

Column 4, line 2, "of FIG. 9; and" should read --of FIG. 9--.

Column 4, line 36, "each of the several the several" should read --each of the several--.

Column 4, line 42, "a line 2" should read --a line 21--.

Column 4, line 52, "ALAn" should read --ALAN--.

Column 4, line 65, "rate" should read --rates--.

Column 5, line 68, "and 3 respectively" should read --and 32 respectively--.

Column 6, line 30, "but not limited the phase" should read --but not limited to the phase--.

Column 7, line 59, "language Rather" should read --language. Rather--.

UNITED STATES PATENT AND TRADEMARK OFFICE
CERTIFICATE OF CORRECTION

PATENT NO. : 5,303,207
DATED : April 12, 1994
INVENTOR(S) : David P. Brady, et al It is certified that error appears in the above-indentified patent and that said Letters Patent is hereby corrected as shown below:

Column 8, line 7, "node 14 a" should read --node 14a--.

Column 9, line 45, "nodes" should read --node's--.

Column 11, line 23, "requests form" should read --requests from--.

Column 11, line 49, "form which" should read --from which--.

Column 14, line 14, "form" should read --from--.

Column 14, line 17, "said modem is coupled between said modem is coupled between" should read --said modem is coupled between--.

Column 14, line 55, "said modem is coupled between said modem is coupled between" should read --said modem is coupled between--.

Signed and Sealed this

Twentieth Day of September, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,303,207
DATED : April 12, 1994
INVENTOR(S) : David P. Brady, et al It is certified that error appears in the above-indentified patent and that said Letters Patent is hereby corrected as shown below:

In column 1 after the title of the invention insert the following new heading and paragraph as follows:

-- GOVERNMENT SUPPORT

Part of this invention was made with government support. Therefore, the U.S. Government has certain rights in this invention. --

Signed and Sealed this

Sixth Day of August, 1996

Attest:

BRUCE LEHMAN

Attesting Officer       Commissioner of Patents and Trademarks

UNITED STATES PATENT AND TRADEMARK OFFICE
CERTIFICATE OF CORRECTION

PATENT NO. : 5,303,207
DATED : April 12, 1994
INVENTOR(S) : David P. Brady, et al It is certified that error appears in the above-indentified patent and that said Letters Patent is hereby corrected as shown below:

Column 1, line 3, insert the following information:

-- GOVERNMENT SUPPORT

This invention was made with government support. The U.S. Government has certain rights in this invention. --

Signed and Sealed this

Twenty-ninth Day of October 1996

Attest:

BRUCE LEHMAN

Attesting Officer

Commissioner of Patents and Trademarks